(12) United States Patent
Corl, Jr. et al.

(10) Patent No.: US 6,529,897 B1
(45) Date of Patent: Mar. 4, 2003

(54) METHOD AND SYSTEM FOR TESTING FILTER RULES USING CACHING AND A TREE STRUCTURE

(75) Inventors: Everett Arthur Corl, Jr., Raleigh, NC (US); Gordon Taylor Davis, Chapel Hill, NC (US); Clark Debs Jeffries, Durham, NC (US); Malcolm Scott Ware, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,500

(22) Filed: Mar. 31, 2000

(51) Int. Cl.[7] .............................................. G06F 17/30
(52) U.S. Cl. ......................................................... 707/2
(58) Field of Search ................................ 707/1, 2, 3, 5, 707/100, 102; 370/401; 709/203, 218, 225, 238, 239; 712/235; 714/26, 758

(56) References Cited

U.S. PATENT DOCUMENTS

| | | | |
|---|---|---|---|
| 5,008,820 A | | 4/1991 | Christopher, Jr. et al. ...... 707/1 |
| 5,463,777 A | | 10/1995 | Bialkowski et al. ......... 707/102 |
| 5,574,910 A | * | 11/1996 | Bialkowski et al. ............ 707/1 |
| 5,717,913 A | | 2/1998 | Driscoll .......................... 707/5 |
| 5,748,952 A | | 5/1998 | Chadha et al. .................. 707/2 |
| 5,845,274 A | | 12/1998 | Chadha et al. .................. 707/2 |
| 5,920,699 A | * | 7/1999 | Bare ........................... 709/225 |
| 5,951,649 A | * | 9/1999 | Dobbins et al. ............. 370/351 |
| 5,951,651 A | | 9/1999 | Lakshman et al. .......... 709/239 |
| 5,963,905 A | | 10/1999 | Novak et al. ................. 704/254 |
| 5,978,951 A | | 11/1999 | Lawler et al. ............... 714/758 |
| 6,298,340 B1 | * | 10/2001 | Calvignac et al. .............. 707/1 |

FOREIGN PATENT DOCUMENTS

WO        94/01828        1/1994

OTHER PUBLICATIONS

United Kingdom Search Report, Nov. 28, 2001.

* cited by examiner

*Primary Examiner*—Diane D. Mizrahi
*Assistant Examiner*—Apu M Mofiz
(74) *Attorney, Agent, or Firm*—Sawyer Law Group, LLP; Joscelyn G. Cockburn (57) ABSTRACT

A method and system for testing a plurality of filter rules in a computer system is disclosed. The plurality of filter rules are used with a key that is capable of matching at least one of the plurality of filter rules. The at least one filter rule corresponds to at least one action. The computer system has a cache including a plurality of bins and a decision tree. The method and system include searching a plurality of stored keys in the cache for the key. Preferably, this search of the cache for the key includes determining whether a stored key exactly matches the key. A plurality of stored filter rules corresponds to the plurality of stored keys. A plurality of stored actions corresponds to the plurality of stored filter rules. The cache stores each of the plurality of stored keys and at least one stored action in each bin of a portion of the bins. The method and system also include obtaining the at least one action from the cache if the key is found in plurality of stored keys and otherwise obtaining the at least one action using the decision tree. Preferably, searches of the decision tree and cache start simultaneously. The decision tree search is terminated if the key is found in the cache. The cache is written to if the at least one action is obtained using the decision tree, but preferably only if the at least one filter rule has a priority of one.

33 Claims, 8 Drawing Sheets

Prior Art

METHOD AND SYSTEM FOR TESTING FILTER RULES USING CACHING AND A TREE STRUCTURE

CROSS-REFERENCE TO RELATED APPLICATIONS

The present invention is related to co-pending U.S. patent application Ser. No. 09/540,921 and entitled "SYSTEM, METHOD AND COMPUTER PROGRAM FOR FILTERING MULTI-ACTION RULE SET" and assigned to the assignee of the present invention. The present invention is also related to U.S. patent application Ser. No. 09/312,148 now U.S. Pat. No. 6,298,340 and entitled "SYSTEM METHOD AND COMPUTER PROGRAM FOR FILTERING USING TREE STRUCTURE" and assigned to the assignee of the present invention. The present invention is also related to co-pending U.S. patent application Ser. No. 09/477,578 and entitled "METHOD AND SYSTEM FOR PERFORMING INTERVAL-BASED TESTING OF FILTER RULES" and assigned to the assignee of the present invention.

FIELD OF THE INVENTION

The present invention relates to computer systems, and more particularly to a method and system for testing filter rules by caching the results of a search of a decision tree such as a software managed tree, ternary CAM search, or other search in which keys are tested by rules with numerical ranges of application.

BACKGROUND OF THE INVENTION

Figure 1:
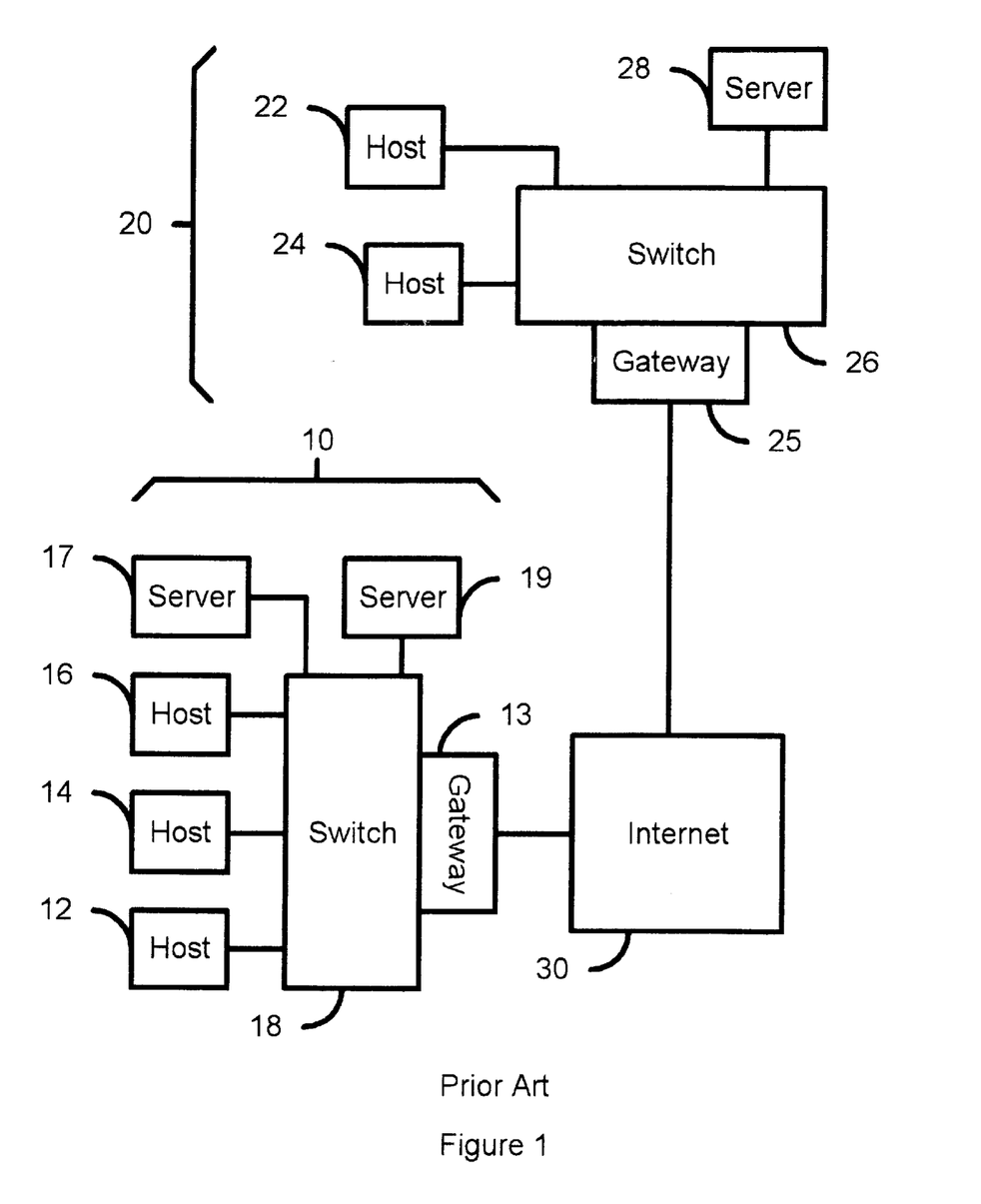
FIG. 1 is a diagram of conventional networks.

FIG. 1 depicts conventional networks 10 and 20 which may be connected to the Internet 30. Each network 10 and 20 includes host (or several hosts) 12, 14 and 16 and 22 and 24, respectively. Each network 10 and 20 also includes a switch (or several switches) 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

In order to manage communications in a network, such as the network 10 or 20, filter rules are used. Filter rules are typically employed by switches of the network. A filter rule tests packets which are being transmitted via a network in order to provide a variety of services. A filter rule may test packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Filter rules may also be used to transmit traffic based on the priorities of packets. For example, packets from a particular host, such as the host 12, may be transmitted because the packets have higher priority even when packets from the hosts 14 or 16 may be dropped. Filter rules may also be used to ensure that new sessions are not permitted to be started when congestion is high even though traffic from established sessions is transmitted. Other functions could be achieved based on the filter rule. Filter rules can also interact, based on the priority for the filter rule. For example, a first filter rule may be a default filter rule, which treats most cases. A second filter rule can be an exception the first filter rule. The second filter rule would typically have a higher priority than the first filter rule to ensure that where a packet matches both the first and the second filter rule, the second filter rule will control.

Filter rules test a key in order to determine whether the filter rule will operate on a particular packet. The key that is typically used is the Internet Protocol (IP) five-tuple of the packet. The IP five-tuple typically contains five fields of interest: the source address, the destination address, the source port, the destination port and the protocol. These fields are typically thirty-two bits, thirty-two bits, sixteen bits, sixteen bits and eight bits, respectively. Thus, the part of IP five-tuple of interest is typically one hundred and four bits in length. Filter rules typically utilize these one hundred and four bits, and possible more bits, in order to perform their functions. For example, based on the source and destination addresses, the filter rule may determine whether a packet from a particular host is allowed to reach a particular destination address.

Furthermore, the key often contains additional bits other than the fields of the IP five-tuple. For example, a TCP SYN (start of session) packet, which starts a session, may be characterized differently than a TCP packet for an existing session. This characterization is accomplished using bits in addition to those in the IP five-tuple. The additional bits may be used by a filter rule which manages traffic through a network. For example, when the network is congested, the filter rule may proactively drop the TCP SYN packet while transmitting TCP packets for existing sessions. These operations allow the network to continue to operate and help reduce congestion. In order to perform this function, however, the filter rule utilizes a SYN packet or the additional bits which characterize a packet as a start packet or a packet from an existing session. Thus, the filter rules typically operate using a key that includes at least some fields of the IP five-tuple of a packet and may include additional bits.

In order to manage traffic over a network, such as the network 10, multiple filter rules are typically used. In addition, different types of filter rules may be used. The type of the filter rule is determined by the type of action which a filter rule may take if a key matches the filter rule. For example, one type of action may be permit or deny. Based on the key, such a filter rule determines whether to permit or deny access of a particular packet to a portion of the network. Another type of action may be a quality of service. For example, the network may provide five levels of service. When the key matches a filter rule of this type, the quality of service for the packet is determined to be one of the five possible levels of service. Yet another type of filter rule may be to tag or not tag a particular packet. Thus, based on whether the key for a packet matches a filter rule of this type, a bit may be set in an extended key or the packet five-tuple. Within each type of filter rule, different filter rules may also have different priorities. Thus, if a key matches more than one filter rule in a particular type, the action(s) to be taken can be determined based on the priorities of the filter rules matched.

Each of the filter rules, regardless of type, typically utilizes one of two criteria for testing keys. One category of filter rule utilizes an exact match. The filter rule operates on a packet if the key or a field of the key for the packet exactly matches the criteria for the filter rule. If no exact match exists, then the filter rule is not invoked. Such a filter rule is relatively easy to test keys against.

The second category of filter rule utilizes one or more ranges of values against which a key is tested. One criterion for such a filter rule is typically a range of values for a field of a key. For example, if a key utilizes the IP five-tuple, the criteria for the filter rule would typically include a range of values for one or more of the five fields of the IP five-tuple. The values for each of the fields are determined by converting the bits in a field to a binary number. For example, the thirty-two bit source address field can be converted into an integer between zero (all bits of the thirty-two bit binary number are zeroes) and over four billion (all thirty-two bits of the binary number are ones). The filter rule is tested by determining whether keys for incoming packets have values that are within the ranges for the appropriate field.

A particular filter rule may use an exact match for each field of a key, may use ranges for each field of a key, or may use some combination of the two. The filter rule is tested by determining whether the key meets the criteria of the filter rule for each field. Where a filter rule uses a range of values as a criterion for the field, that portion of the filter rule is tested by determining whether the corresponding field of the key fits within the range of values. Where a filter rule requires an exact match for a field, that portion of the filter rule is tested by determining whether the corresponding field of the key exactly matches the value of the filter rule.

A set of filter rules used in a system may include interval-based filter rules and may include multiple types of filter rules having differing priorities. One of ordinary skill in the art will readily recognize that such a set of filter rules is difficult to test. Typically, each filter rule in the set is tested against the key. The filter rules are also typically tested in order, based on the priorities of the filter rules. Furthermore, filter rules of each type are tested. Explicitly testing such a large number of filter rules may be expensive and time-consuming. Furthermore, interval-based filter rules are tested against a particular key by determining whether the field of the key is within the corresponding range of values for that field. The range of values for the field may be quite large. In order to explicitly test the key against this range of values, a structure which consumes a relatively large amount of memory must be built. In addition, such a test often requires a relatively large amount of time to complete. Thus, such a filter rule is expensive both in terms of time and memory. It is, therefore, expensive to test a number filter rules which may have different types, may have different priorities and which may be interval-based.

Accordingly, what is needed is an improved method and system for testing filter rules. The present invention addresses such a need.

SUMMARY OF THE INVENTION

The present invention provides a method and system for testing a plurality of filter rules in a computer system. The plurality of filter rules are used with a key that is capable of matching at least one filter rule of the plurality of filter rules. The at least one filter rule corresponds to at least one action. The computer system includes a cache and a decision tree. The cache includes a plurality of bins. The method and system comprise searching a plurality of stored keys in the cache for the key. A plurality of stored filter rules corresponds to the plurality of stored keys. A plurality of stored actions corresponds to the plurality of stored filter rules. The cache stores each of the plurality of stored keys and at least one stored action of the plurality of stored actions in each bin of a portion of the plurality of bins. The method and system also comprise obtaining the at least one action from the plurality of stored actions in the cache if the key is found in plurality of stored keys of the cache and obtaining the at least one action using the decision tree if the key is not found in the plurality of stored keys in the cache.

According to the system and method disclosed herein, the present invention can rapidly and simply determine whether a key matches a filter rule by utilizing the information stored in the cache and initially obtained often at great computational expense.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

U.S. patent application Ser. No. 09/540,921 and now U.S. Pat. No. 6,473,763 and entitled "SYSTEM, METHOD AND COMPUTER PROGRAM FOR FILTERING USING A TREE STRUCTURE" and assigned to the assignee of the present invention, U.S. patent application Ser. No. 09/312,148 and now U.S. Pat. No. 6,298,340 and entitled "SYSTEM METHOD AND COMPUTER PROGRAM FOR FILTERING USING TREE STRUCTURE" and assigned to the assignee of the present invention, and co-pending and pending U.S. patent application Ser. No. 09/477,578 and entitled "METHOD AND SYSTEM FOR PERFORMING INTERVAL-BASED TESTING OF FILTER RULES" and assigned to the assignee of the present invention all describe improve mechanisms for testing filter rules. Applicant hereby incorporates by reference the above-mentioned co-pending patent applications. In particular, decision trees are utilized for testing filter rules. In preferred embodiments, these decision trees are software-managed decision trees.

Figure 2:
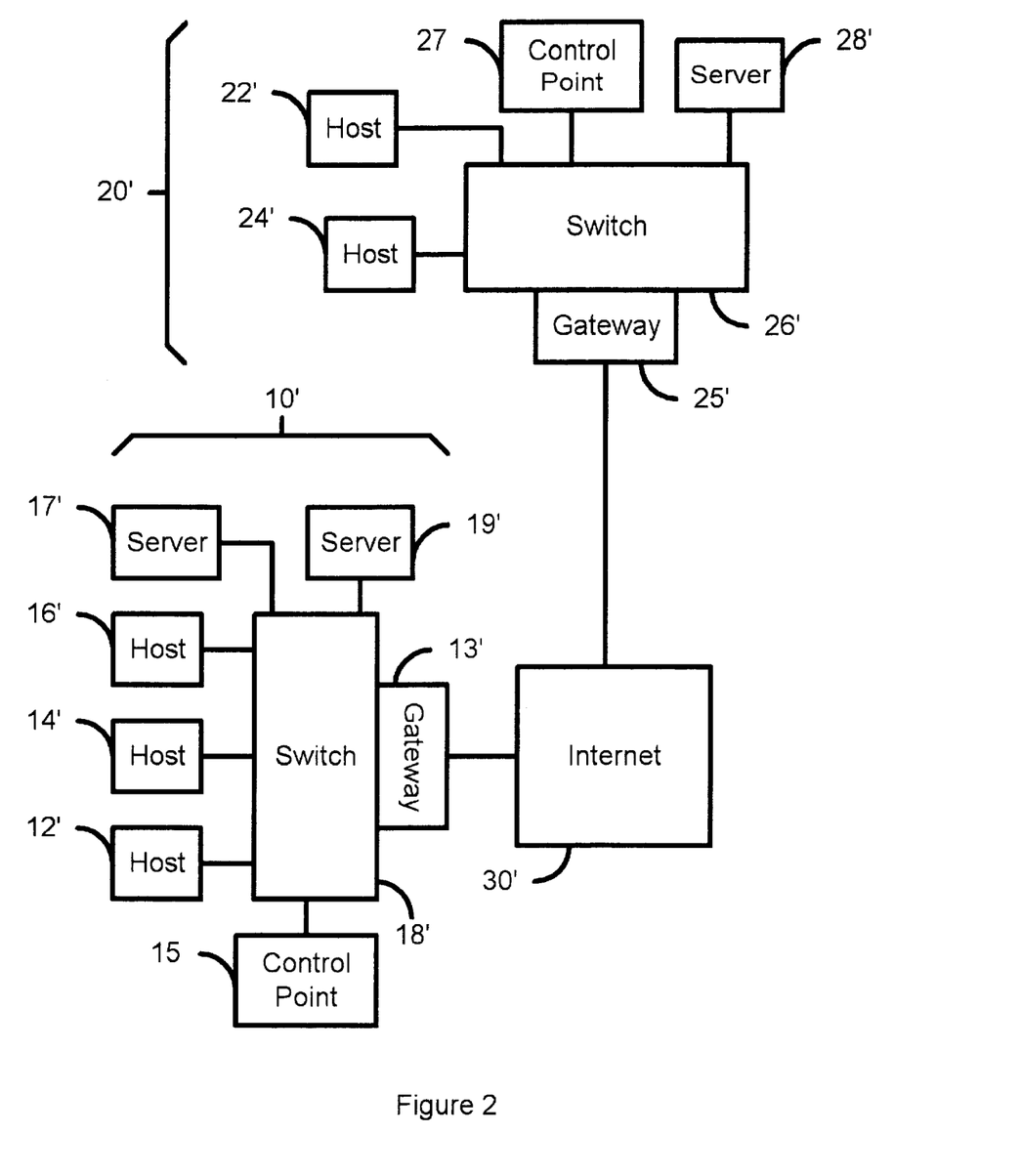
FIG. 2 is a diagram of networks in which the present invention can be used.

FIG. 2 depicts embodiments networks 20' and 10' with which the above-mentioned co-pending applications may be used. The networks 10' and 20' are substantially the same as the networks 10 and 20 depicted in FIG. 1. However, also shown are control points 15 and 27. The control points 15 and 27 are preferably general purpose computers coupled with switches 18' and 26'. The control points 15 and 27 preferably perform functions relating matrices and selection of bits to be used in testing filter rules, as discussed below. The switches 18' and 26' preferably include the software managed decision trees (not shown in FIG. 2), as discussed below, and determine whether a key matches one or more of the filter rules using the decision trees.

Figure 3A:
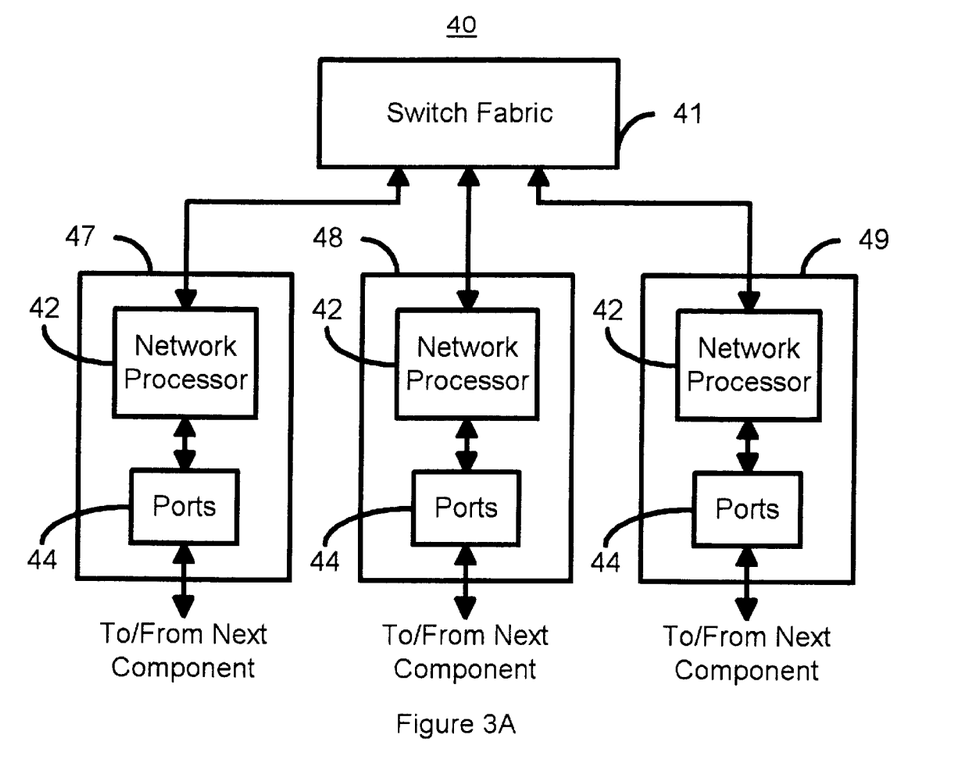
FIG. 3A is a diagram of a switch in which the present invention can be used.

FIG. 3A depicts one embodiment of a switch 40 that can be used in the networks 10, 20, 30, 10', 20' or 30'. The switch 40 includes a switch fabric 41 coupled with blades 47, 48 and 49. Each blade 47, 48 and 49 is generally a circuit board and includes at least a network processor 42 coupled with ports 44. Thus, the ports 44 are coupled with hosts (not shown) or other components in the network in which the switch 40 resides. The blades 47, 48 and 49 can provide traffic to the switch fabric 44 and accept traffic from the switch fabric 41. Thus, any component connected with one of the blades 47, 48 or 49 can communicate with another component connected to another blade 47, 48 or 49 or connected to the same blade.

Figure 3B:
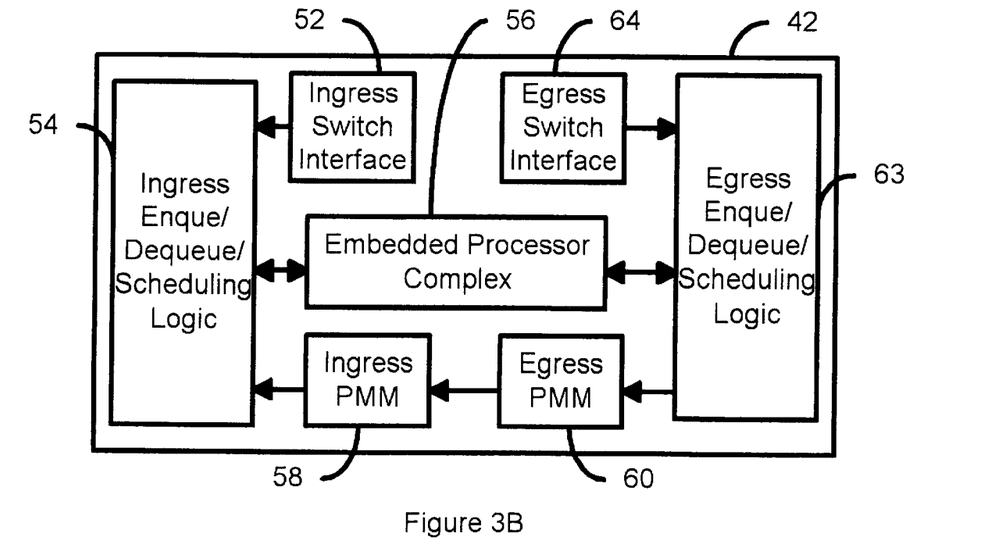
FIG. 3B is a diagram of a network processor with which the present invention can be used.

FIG. 3B depicts a high-level block diagram of one embodiment of a network processor 42. The network processor 42 includes an ingress switch interface (ingress SWI) 52, an ingress enqueue/dequeue/scheduling logic (ingress EDS) 54, an embedded processor complex (EPC) 56, an ingress physical MAC multiplexer (ingress PMM) 58, and egress physical MAC multiplexer (egress PMM) 60, an egress enqueue/dequeue/scheduling logic (egress EDS) 62 and an egress switch interface (egress SWI) 64. The network processor 42 may also contain other storage and processing devices. The ingress SWI 52 and egress SWI 64 are coupled with the switch fabric 41 (depicted in FIG. 3A) for the switch 40. Referring back to FIG. 3B, the EPC 56 includes a number of protocol processors plus co-processors. The ingress EDS 54 and egress EDS 62 can perform certain enqueuing, dequeuing and scheduling functions for traffic traveling from devices, such as Ethernet devices, to the switch fabric and for traffic traveling from the switch fabric to the devices, respectively. The ingress SWI 52 and egress SWI 64 provide links for connecting to other devices, such as another network processor or switch (not shown in FIG. 3B). The ingress PMM 58 and egress PMM 60 receive traffic from and transmit traffic to, respectively, physical layer devices.

The above-mentioned co-pending application can utilize the networks 10', 20' or 30', the switch 40 and the network processor 42 for testing of filter rules. In particular, the above-mentioned co-pending applications determine the filter rules that a key for each packet matches and, therefore, the actions to be enforced on the packet to which the key corresponds. The above-mentioned co-pending applications utilize a decision tree, particularly a software managed decision tree to test filter rules.

Figure 4:
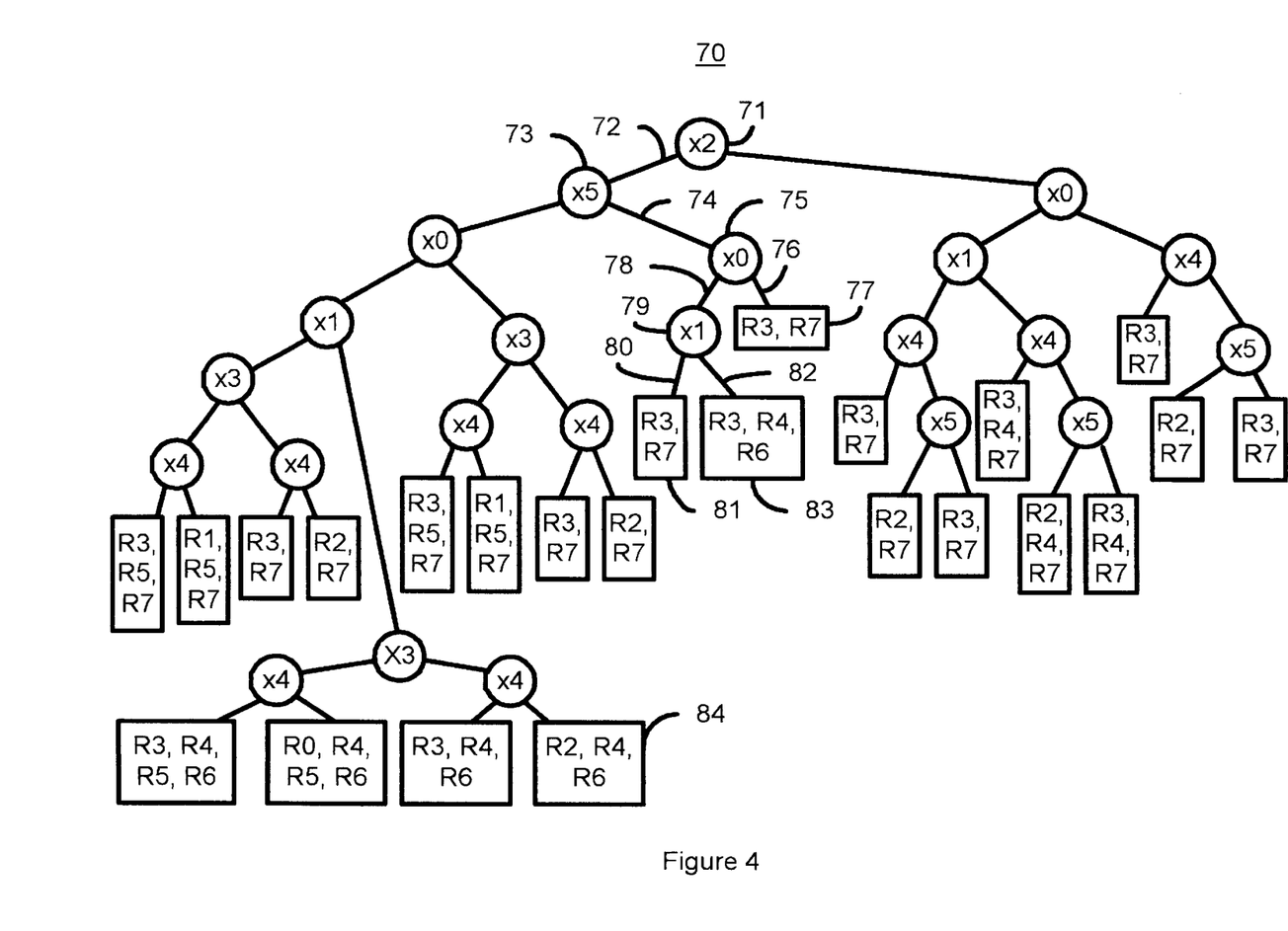
FIG. 4 is a diagram of an example of a portion of a particular decision tree that could be used in testing filter rules.

FIG. 4 depicts one example of a decision tree 70. The decision tree 70 is preferably a software managed tree, a ternary CAM search, or other search in which keys are tested by rules with numerical ranges of application. Any such device will be referred to as a decision tress. The decision tree 70 is used for a specific set of filter rules, R1 through R7, each of which has a specific range. In addition, the key with which the filter rules are used has a number of bits. These bits may be numbered x0 through xn, where x0 is the least significant bit and xn is the nth, most significant bit. Using the decision tree 70, different individual bits of the key may be tested at each node. For example, the first node 71 tests the bit x2 of a particular key for a packet. Based on the resultant of the test of bit x2, other bits of the key are tested until the decision tree 70 narrows the filter rules which the key might match to one or more filter rules. For example, if the bit x2 for the key is a one, then branch 72 is taken. The node 73 is then used to test bit x4. If the bit x4 is a zero, then branch 74 is taken to node 75. At node 75, bit x0 is tested. If bit x0 for the key is a zero, then branch 76 is taken and leaf 77 indicates that the key could match rules R3 or R7. If the bit x0 for the key is a one, then branch 78 is taken to node 79. At node 79, the bit x1 for the key is tested. If the bit x1 for the key is a one, then the branch 80 is taken and the leaf 81 indicates that the key could match rules R3 or R7. If the bit x1 for the key is a zero, then the branch 62 is taken to the leaf 83. The leaf 83 indicates that the key could match rules R3, R4 or R6. The other nodes and branches of the decision tree 70 could be used similarly to narrow the filter rules which the key can match.

Once the decision tree 70 has been used to narrow the filter rules which a key can match to the filter rules on a leaf, such as the leaves 76, 82 or 83, the remaining filter rules can be explicitly tested to ascertain which filter rule(s) the key actually matches. Thus, the all bits of the key may be tested explicitly against a small number of filter rules. As a result, the number of filter rules against which the key is explicitly tested can be greatly reduced. Consequently, computational time and effort can be reduced. As a result, the filter rule(s) which a key may match can be determined relatively quickly.

Although the above-mentioned co-pending applications work well for their intended purpose, one of ordinary skill in the art will readily realize that use of the decision tree 70 still consumes a relatively large amount of time. In many cases, filter rules utilize ranges that are not easily defined using binary numbers. In other words, the endpoints for ranges of filter rules cannot usually be defined by specifying certain bits, such as the most significant bits, to be zero while other bits are allowed to vary between zero and one. For example, a filter rule might be applied for a source address in an IP five-tuple between one thousand and thirty thousand. The source addresses in this range cannot be easily specified using binary numbers because the upper and lower limits of the range are not binary numbers with zeroes in some number of the most significant digits and ones in the remaining digits. Because many filter rules have such domains, testing of the key, even single bits of the key using the decision tree 70 can be time consuming. Furthermore, it may take a relatively long time to reach a particular leaf in a decision tree. For example, to reach the leaf 84, six nodes must be traversed. For a decision tree that is more complex than the decision tree 70, a significantly larger number of nodes may be traversed before finding a leaf including the filter rules which the key may match. Although less time may be taken than explicitly testing the key against each filter rule, traversing such a large number of nodes in a decision tree and testing such a large number of bits in the key may consume a relatively large amount of time. In order for traffic to be rapidly routed through a network, it would be desirable to improve the efficiency of testing of filter rules, even where testing utilizes decision trees, particularly software managed trees.

The present invention provides a method and system for testing a plurality of filter rules in a computer system. The plurality of filter rules are used with a key that is capable of matching at least one filter rule of the plurality of filter rules. The at least one filter rule corresponds to at least one action. The computer system includes a cache and a decision tree. The cache includes a plurality of bins. The method and system comprise searching a plurality of stored keys in the cache for the key. A plurality of stored filter rules corresponds to the plurality of stored keys. A plurality of stored actions corresponds to the plurality of stored filter rules. The cache stores each of the plurality of stored keys and at least one stored action of the plurality of stored actions in each bin of a portion of the plurality of bins. The method and system also comprise obtaining the at least one action from the plurality of stored actions in the cache if the key is found in plurality of stored keys of the cache and obtaining the at least one action using the decision tree if the key is not found in the plurality of stored keys in the cache.

The present invention will be described in terms of a switch that controls traffic over a network. However, the present invention can function in other environments in which filter rules are used. The present invention will also be described in terms of particular decision trees, such as software managed trees, and particular mechanisms for providing the decision trees. One of ordinary skill in the art will, however, readily recognize that the present invention can be utilized with other decision trees provided using other mechanisms. In addition, the present invention will be described in the context of caching keys and actions that filter rules matching the keys enforce. However, one of ordinary skill in the art will readily realize that other items corresponding to the matching filter rules could be cached in addition to or in lieu of the corresponding actions. In some contexts, the present invention will also be described in terms of a single action and a single filter rule matching a particular key. However, one of ordinary skill in the art will readily recognize that multiple filter rules could match a key and multiple actions corresponding to these filter rules could be enforced. In a preferred embodiment, however, the actions enforced will not be contradictory and the filter rules considered to match the key could include only the highest priority intersecting filter rules or non-intersecting filter rules.

Figure 5:
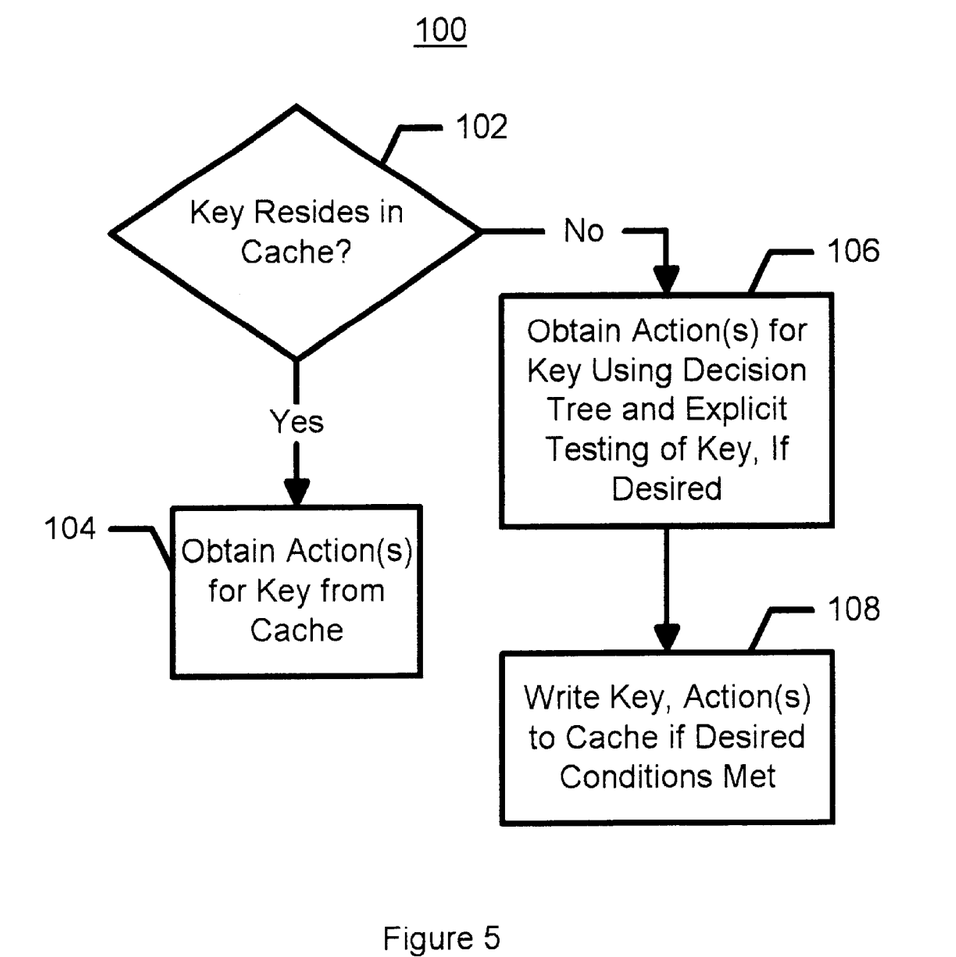
FIG. 5 is a flow chart of one embodiment of a method for testing filter rules using a decision tree and a cache in accordance with the present invention.
Figure 10:
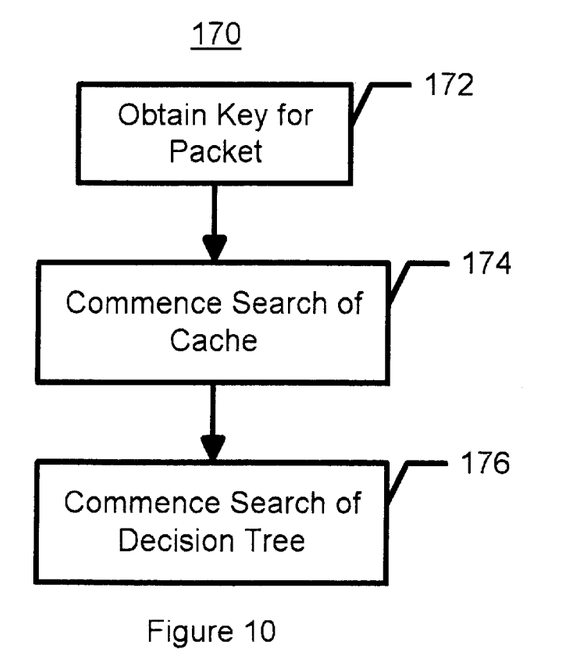
FIG. 10 is flow chart of third embodiment of a method for commencing the search of the cache and the decision tree in accordance with the present invention.

To more particularly illustrate the method and system in accordance with the present invention, refer now to FIG. 5, depicting one embodiment of a method 100 in accordance with the present invention. The method 100 is preferably used in conjunction with the inventions described in co-pending U.S. patent application Ser. No. 09/540,921 and now U.S. Pat. No. 6,473,763 and entitled "SYSTEM, METHOD AND COMPUTER PROGRAM FOR FILTERING USING A TREE STRUCTURE" and assigned to the assignee of the present invention, U.S. patent application Ser. No. 09/312,148 and now U.S. Pat. No. 6,298,340 and entitled "SYSTEM METHOD AND COMPUTER PROGRAM FOR FILTERING USING TREE STRUCTURE" and assigned to the assignee of the present invention, and co-pending U.S. patent application Ser. No. 09/477,578 and entitled "METHOD AND SYSTEM FOR PERFORMING INTERVAL-BASED TESTING OF FILTER RULES" (RAL999-0097) and assigned to the assignee of the present invention all describe improve mechanisms for testing filter rules. Thus, in a preferred embodiment, the method 100 is used with one or more decision trees, preferably software managed decision trees, which are described in the above-mentioned copending applications. The method 100 is thus preferably used by the switch 18, 26, 18', 26' and 40 and the network processor 42. The method 100 is generally considered to be part of classification and thus would be implemented by a classifier such as the ingress EDS 54 depicted in FIG. 3B. Referring back to FIG. 5, the method 100 also utilizes a decision tree, such as the decision tree 70 depicted in FIG. 4, and a cache, one embodiment of which is depicted in FIG. 10. The cache stores keys (stored keys) which have previously been found using the decision tree and the corresponding actions (stored actions) for the filter rules (stored filter rules) which match the stored keys.

Referring back to FIG. 5, the method 100 commences after a key for a packet has been obtained from the packet. The key for a packet may be the IP five-tuple or another key. It is determined whether the key is in the cache, via step 102. The stored keys in the cache are searched for the key in step 102. In one embodiment, the cache includes a single entry, or bin, for certain values of the key. In this embodiment, the cache is indexed and searched based on the key. In another embodiment, the cache is indexed and searched based on a hashed key. Thus, searching the stored keys in step 102 searches the cache and determines whether the key has been found among the stored keys in the cache. If the key is in the cache, then the action(s) for the filter rule(s) which the key matches are obtained from the cache, via step 104. Thus, step 104 obtains the stored action(s) that correspond to the key. In a preferred embodiment, the stored actions are stored in the same location, or bin, in the cache as the stored key.

If the key is not in the cache, then the action(s) for the filter rule(s) that the key matches are obtained using the decision tree, via step 106. Preferably, step 106 includes obtaining the matching filter rule(s) from the decision tree and, if desired, from explicit testing of the key against the filter rule(s). Step 106 would also include obtaining the action(s) corresponding to the filter rule(s) that the key matches. Explicit testing can include testing each bit of the key to determine accurately determine whether the key matches the corresponding filter rules.

If the action is found using the decision tree, then the key and the action(s) may be written to the cache, via step 108. In one embodiment, a key and the action(s) corresponding to the matching filter rule(s) are written to the cache each time the key is matched using the decision tree. In another embodiment the key and the action(s) are written to a bin in the cache if the key is matched using the decision tree and the matching filter rule(s) have a higher priority than the filter rule(s) corresponding to the stored action currently in the bin in the cache. Thus, the stored key and the stored action(s) will be overwritten if the action for the newly matched filter rule(s) would be enforced in lieu of the stored action(s). In a preferred embodiment, the key and action(s) corresponding to the matching filter rule(s) are only written to the cache if the key is matched using the decision tree and if matching filter rule(s) has a priority of one, the highest priority. A priority of one for a filter rule means that the filter rule is not dominated by another filter rule. Thus, the filter rule either does not intersect another filter rule or the filter rule will be utilized in lieu of (has a higher priority than) any intersecting filter rule. Two filter rules intersect when some portion of the range for the filter rules overlaps, or more precisely, when at least one key can fit both rules. Also in a preferred embodiment, if the action found in step 106 is written into the cache in step 108, the key and the action(s) are written into a position in the cache based on the value of the key. In such an embodiment, a stored key and stored action(s) occupying the same position are overwritten by the new key and the new action(s). Thus, the cache preferably includes a plurality of bins. Each bin is capable of holding one key, the corresponding action(s) and, if a hash is used, the hash for the key. The contents of a bin may then be overwritten when a new key and new action corresponding to the bin are tested and determined, respectively.

In a preferred embodiment, a particular bin in the cache stores the most recent key that corresponds to the bin, a hashed key of the most recent key corresponding to the bin if a hash is used, and the action(s) corresponding to the filter rule(s) matching to the key. As used herein, a hashed key is the hash value of the key that corresponds to a particular bin in the cache. In a preferred embodiment, at most one filter rule is determined to match each key. Thus, in a preferred embodiment, the action(s) for one filter rule are stored in the bin. The action found using the cache or the decision tree can then be enforced for the packet corresponding to the key against which the filter rules are tested.

Thus, the method 100 saves computational time by caching the results of the search that uses a decision tree. If the key and the action(s) corresponding to the matching filter rule(s) can be found in the cache, the decision tree need not be used. Although use of the decision tree is an improvement over explicitly testing each key against each filter rule, the decision tree may be relatively computationally expensive. A search of the cache is often faster then using the decision tree. Consequently, use of the cache may save time in testing filter rules. However, when the key cannot be found in the cache, the action(s) corresponding to the matching filter rule(s) can still be obtained using the decision tree and, if desired, explicit testing. The result of the use of the decision tree can then be stored in the cache for future use. A penalty of writing the results of the use of the decision tree is thus incurred when a key cannot be found in the cache. However, if the expected cost of using the cache and the decision tree together (including administration of searches and occasionally writing decision tree results into the cache) is less than the cost of simply using the decision tree, the present invention has value. This condition is often fulfilled. Thus, use of the cache and the decision tree can ensure that the actions for matching filter rules are determined and enforced and save time in testing the filter rules against the key for a packet.

Figure 6:
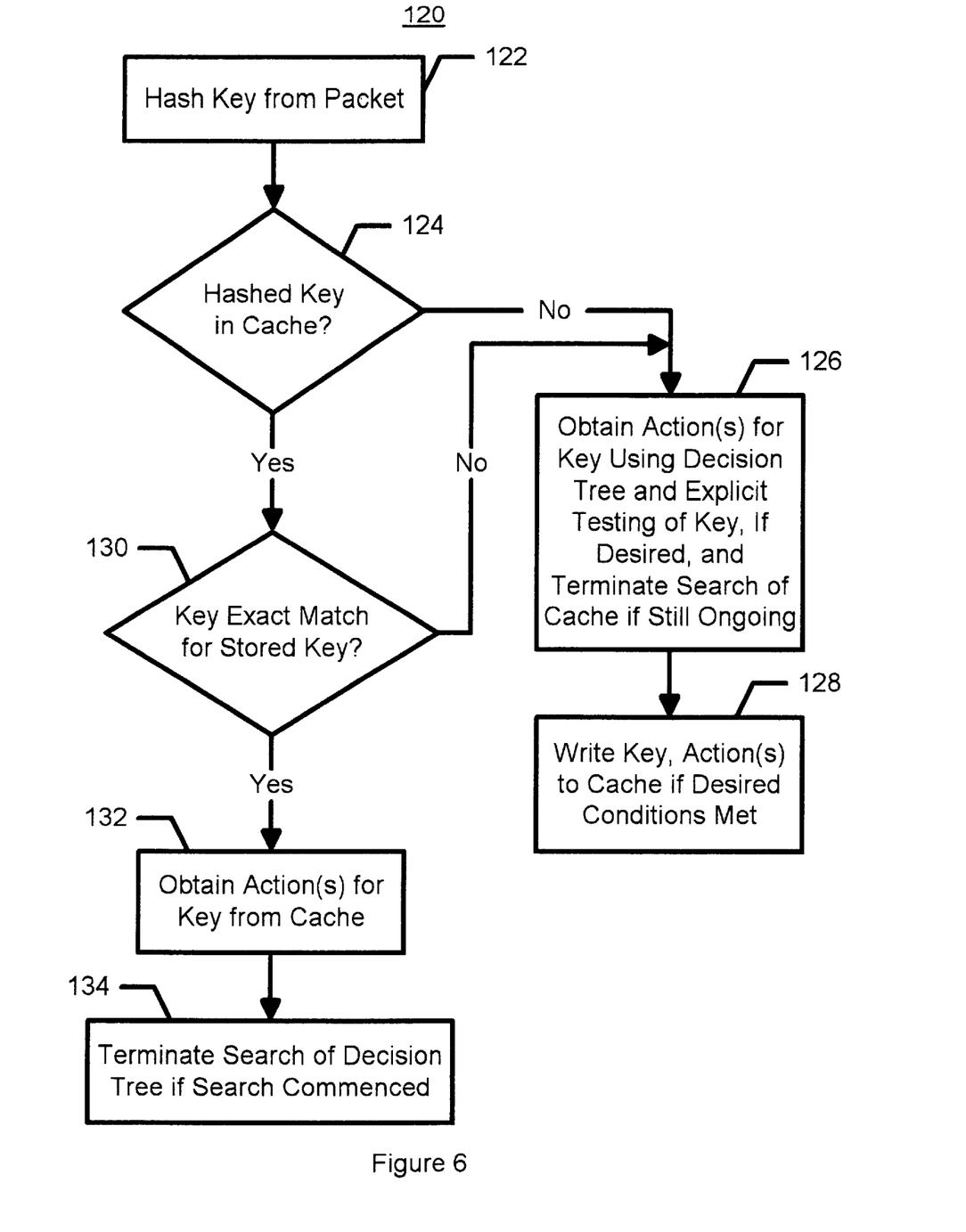
FIG. 6 is a more detailed flow chart of a method for testing filter rules using a decision tree and a cache in accordance with the present invention.

FIG. 6 depicts a more detailed flow chart of a preferred embodiment of a method 120 for testing filter rules in accordance with the present invention. In many respects, the method 120 is analogous to the method 100 depicted in FIG. 5. Referring back to FIG. 6, the method 120 is thus used in conjunction with the apparatus, methods and co-pending applications discussed above with respect to the method 100, depicted in FIG. 5. Referring back to FIG. 6, the method 120 utilizes a cache and a decision tree, preferably a software managed tree. The method 120 commences after the key has been obtained for a packet to be transmitted. In one embodiment, the key may be the IP five-tuple for the packet. For example, in one embodiment, the key includes one hundred and ninety-two bits. For clarity, the method 120 will be described in the context of a single action capable of being stored and enforced for a particular key. However, the method and system function when multiple actions can be enforced for a single key.

The key is hashed to a fewer number of bits, via step 122. In a preferred embodiment, the hashed key may include ten bits. The hash function used is preferably a random hash. It is then determined if the cache contains the hashed key among stored hashed keys, via step 124. In a preferred embodiment, the cache includes one bin for each possible value of the hashed key. Thus, the cache can be considered to be indexed by the hashed key. Each bin in the cache can be empty or occupied by one stored hashed key, one stored key, and a stored action. Thus, the first ten bits of each occupied bin in the cache, corresponding to the stored hashed keys, are searched in step 124 to determine whether the hashed key is in the cache, among the stored hashed keys. It is also determined whether the hashed key resides in the cache in step 124. Step 124 thus generally includes merely determining whether the hashed key has been found by the search of the cache commenced in step 124.

If the hashed key has not been found in the cache, then the action for the hashed key is obtained using a search of the decision tree and, if desired, explicit testing of the filter rules matching the key that are found using the decision tree, via step 126. Thus, step 126 preferably includes traversing the decision tree until a particular leaf is found, explicitly testing the key against the filter rules corresponding to the leaf and determining the action corresponding to each filter rule the key matches. Step 126 also preferably includes terminating the search of the cache and sending a notification that the search of the cache has been terminated.

The hashed key, the key and the action found in step 126 are written to the cache, via step 128. In one embodiment, the cache is written to in step 128 each time the decision tree is used to obtain the action. In a preferred embodiment, the key and action(s) corresponding to the matching filter rule(s) are only written to the cache if the key is matched using the decision tree and if matching filter rule(s) has a priority of one. In another embodiment the key and the action(s) are written to a bin in the cache if the key is matched using the decision tree and the matching filter rule(s) have a higher priority than the filter rule(s) corresponding to the stored action currently in the bin in the cache.

If it is determined in step 124 that the hashed key matches a stored hashed key in the cache, then it is determined whether the stored key corresponding to the stored hashed key exactly matches the key, via step 130. Thus, a fixed match test of the key is preferably performed to determine whether each bit of the key exactly matches the corresponding bit in the stored key. Step 130 is carried out because two different keys might be hashed to the same hashed key. These different keys having the same hashed key might not match the same filter rules. Thus, step 130 ensures that the wrong action is not enforced for the key. In other words, step 130 ensures that the stored key exactly matches the key being tested to ensure that only correct actions are enforced for the key being tested.

If the key does not exactly match the stored key, then step 126 is returned to. Thus, the search of the cache is terminated and the appropriate action for the key will be obtained using the decision tree. If the key exactly matches the stored key, then the action is obtained from the cache, via step 132. The action obtained in step 132 is the stored action corresponding to the stored hashed key and the stored key. Consequently, the correct action can be enforced for the key. The search of the decision tree is then terminated if the search had previously been commenced or prevented if the search had not been commenced, via step 134. Thus, step 134 ensures that the search of the decision tree does not continue after the action has been obtained from the cache.

Figure 7:
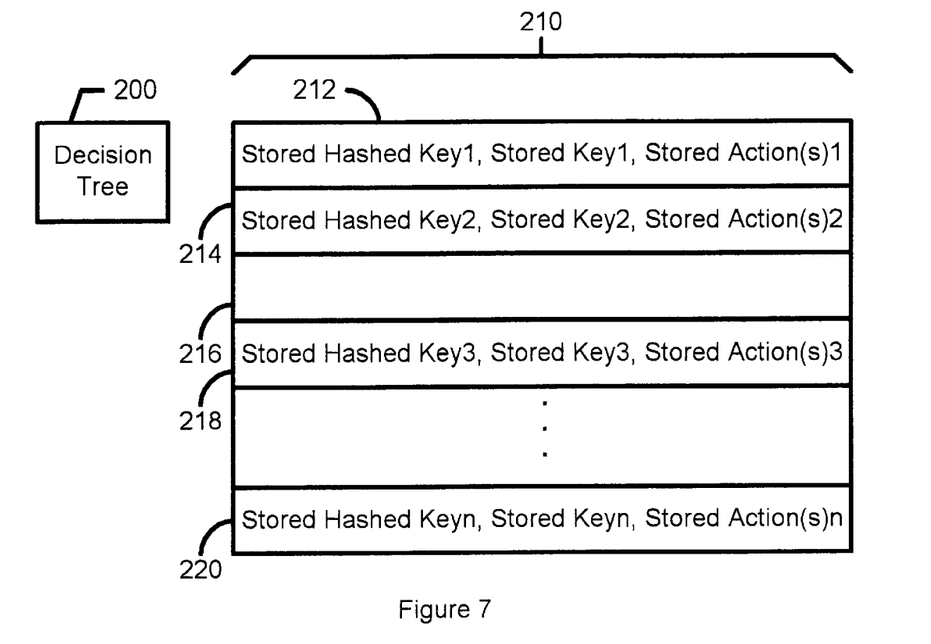
FIG. 7 is diagram of one embodiment of a portion of a system for testing filter rules in accordance with the present invention.

FIG. 7 depicts a preferred embodiment of a decision tree 200 and a cache 210 used with the method 100 or 120. The decision tree 200 is preferably a software managed tree. The decision tree 200 includes a number of nodes, branches, and leaves, analogous to those of the decision tree 70 depicted in FIG. 4. Referring back to FIG. 7, the cache 210 includes a number of locations, or bins, 212, 214, 216, 218 and 220. For an embodiment using a hashed key having ten bits, the cache 210 includes 1024 bins. In each bin, a corresponding stored hashed key, stored key and action(s) are stored. For example, in one embodiment, each hashed key has ten bits and each key has one hundred and ninety-two bits. Thus, the first ten bits in each bin that is not empty is the stored hashed key for that bin. The next one hundred and ninety-two bits in each bin that is not empty is the stored key for that bin. The action(s) occupy at least a portion of the bin that remains. The bins 212, 214, 216, 218 and 220 store information based on the hashed key.

When the cache 210 is written to in step 128, either an empty bin, such as the bin 216, is written to or an occupied bin, such as the bin 212, 214, 218 or 220, is written to. If an occupied bin is written to, then the stored hashed key, the stored key and the stored action are overwritten. Thus, each bin 212, 214, 216, 218 or 220 is capable of storing at most one stored hashed key, the corresponding stored key and the corresponding stored action(s). As discussed above, each hashed key preferably corresponds to a particular bin of the cache 210. However, multiple keys may be hashed to the same hashed key.

In order for the cache 210 and the methods 100 and 120 to operate more efficiently, the frequent fliers are written to the cache 210. Frequent fliers are those keys, as well as the corresponding hashed keys and action(s), which occur repeatedly. Thus, it is desired that these frequent fliers are written to the cache for reuse later. It is also desirable that keys and the corresponding data that are not frequent fliers are not written to the cache. As a result, any time taken to perform steps 108 and 128 can be saved for non-frequent fliers.

Although in a preferred embodiment, the cache 210 is used, in an alternate embodiment another type of cache could be used to cache data, preferably the frequent fliers. For example, a least recently used algorithm implemented in a stack could be utilized. Thus, a stack of a particular number of items is saved. When a new item is written to the stack, the least recently used item in the stack is discarded in favor of the new item. In such a case, the probability that an item in a certain data stream is the same as the previous item might be 0.03. Thus, it is likely that the least recently used algorithm implemented with a stack will be capable of efficiently caching frequent fliers. However, one of ordinary skill in the art will readily recognize that maintaining such a stack can be computationally expensive. This is because maintaining such a stack typically includes moving pointers between different positions in the stack as new items are added to the stack. The purpose of the methods 100 and 120 are to improve the performance of the system by reducing the computational time required to test a filter rule. Use of a least recently used algorithm and a stack thus may not improve the performance of the switch 40. Thus, a cache such as the cache 210 is preferred.

As discussed previously, the hash used is preferably a random hash. In addition, the cache includes bins corresponding to the hashed keys, with each bin storing at most one stored hashed key, the corresponding stored key and the corresponding action. In a typical system, use of a random hash might not improve efficiency of testing the filter rules. For example, if n keys are randomly hashed to a hashed key having a length of w. A cache having $2^w$ bins would have a bin for each hashed key. The expected value for the number of neighbors for any particular key is $(n-1)/2^w$. For one thousand items, a ten-bit hashed key and a cache having 1024 bins, the expected value for a particular key is 0.98. Thus, random hashes tend to place on average approximately two keys in each bin. However, there is no guarantee that an item is the same as a previous item. Thus, different items which are frequent fliers might be written to the same bin. Consequently, without more, use of a random hash may not allow for efficient caching.

However, a rule of thumb in computer programming known as the 80–20 rule of thumb. The 80–20 rule was proposed by D. Knuth in *Art of Computer Programming*, published in 1998 by Addison-Wesley. The 80–20 rule of thumb states that eighty percent of the transactions in a system deal with the most active twenty percent of the data. Thus, it is proposed that approximately eighty percent of the packets in traffic through a switch, such as the switch 40, will include the approximately twenty percent of the most frequently used keys. In other words, eighty percent of the traffic will include packets having the keys that are frequent fliers, the approximately twenty percent of the keys that are repeatedly used.

The cache 210 makes use of the 80–20 rule. The cache 210, as well as the method 120, utilize the 80–20 rule by keeping the most recently used hashed key, key and action(s) for the hashed key corresponding to a particular bin in the particular bin. In other words, the most recently used item(s) corresponding to a bin are kept in that bin. If there are k different items that may be hashed to the same bin, then using the 80–20 rule, it can be determined that the probability that the next item corresponding to a particular bin is the same as the last item stored in that bin can be approximated by the polynomial $1-0.1*(k-1)+0.003*(k-1)^2$ for k not equal to one. For one thousand items hashed to 1024 bins, the expected value of the next item in a bin being the same as the last item (k=2) using the approximation for the 80–20 rule is 0.903. Thus, there is a relatively high probability that the next item hashed to a particular bin will be the same as the last item for that bin. Consequently, assuming that the 80–20 rule fits the traffic through a network, the caching scheme used in the method 120 and the cache 210 should generally find the key searched for in the cache. Thus, the methods 100 and 120 are efficient methods for caching the keys and action(s) corresponding to matching filter rules even if the methods 100 and 120 use a cache which stores only one set of items (key, action(s) and, in a preferred embodiment, the hashed key) in each bin.

In addition, the methods 100 and 120 are less computationally expensive than other caching mechanisms, such as the use of a least recently used algorithm in conjunction with a stack. The methods 100 and 120 generally save computational time over the use of the decision tree alone. For example, in the best case using the methods 100 or 120 the key will be found in the cache, allowing the action(s) to be enforced for the packet corresponding to the key to be obtained from the cache. In one embodiment, the time taken to hash the key, look up a hashed key in the cache, exactly match the key corresponding to the stored hashed key and obtain the action(s) from the cache is approximately forty-two processor cycles. In such a case, the lookup in the cache can be divided into the following categories: hash function—one cycle, initiate search of decision tree—five cycles, access table (cache)—six cycles, access internal memory—six cycles, pipeline delay to leaf reader—four cycles, read leaf data in SRAM—15 cycles and compare and return results—five cycles. Note that another system using other components will generally result in a different number of cycles being required to obtain the action from the cache. In the worst case, the action must be obtained using the decision tree and written to the cache. Writing the action, the key and the hashed key to the cache might take a total of ten processor cycles. The methods 100, when used with a hashed key, and 120 will be computationally cheaper than use of the decision tree alone when the expected value of obtaining the action from the decision tree is greater than the expected value of obtaining the action(s) in the cache multiplied by the time taken to obtain the rule from the cache plus the expected value of obtaining the action(s) in the cache multiplied by the sum of the time taken to find the rule in the decision tree and the time to write to the cache. Typically, this condition will hold. For example, for one thousand items and a cache having five hundred and twelve bins, the hit ratio is expected to be 0.822 when the 80–20 rule holds. Thus, the above condition will hold true assuming: (0.822)*42 cycles+(1−0.822)*(decision tree cost+10 cycles)<=decision tree cost The above inequality is true when the cost of obtaining the action from the decision tree is greater than or equal to forty-four cycles. In one embodiment, obtaining the action(s) from the decision tree typically requires hundreds of cycles. Use of the methods 100 and 120 and the cache 210 therefore is computationally less expensive than use of the decision tree 200 alone. Testing filter rules using the methods 100 and 120, as well as the cache 210, is thus efficient, relatively computationally inexpensive.

Figure 8:
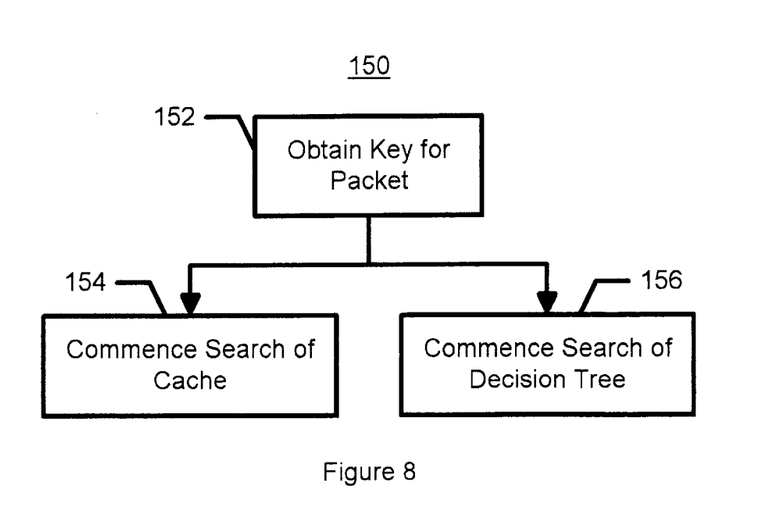
FIG. 8 is flow chart of a first, preferred embodiment of a method for commencing the search of the cache and the decision tree in accordance with the present invention.
Figure 9:
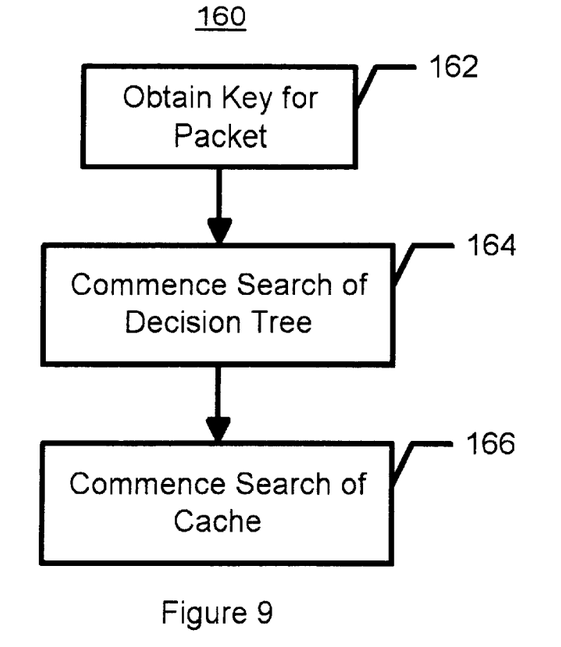
FIG. 9 is flow chart of a second embodiment of a method for commencing the search of the cache and the decision tree in accordance with the present invention.

As discussed above, in the methods 100 and 120, the cache and the decision tree may be searched to obtain the action(s) for the key. FIGS. 8–10 depict embodiments of methods 150, 160 and 170, respectively, that can be used to determine when the search of the cache 210 and the decision tree 200 are commenced. The search of the cache 210 is used in determining whether the key or hashed key is in the cache 210, for example in steps 102 and 124 of the methods 100 and 120, respectively, depicted in FIGS. 5 and 6, respectively. The search of the decision tree 200 is used in obtaining the action through the decision tree in steps 106 and 126 of the methods 100 and 120, respectively. Depending on the goals of the system using the cache 210 and the decision tree 200, the searches may be commenced at different times.

FIG. 8 depicts a preferred embodiment of a method 150 for commencing the search of the cache and the decision tree. The key is obtained from the packet, via step 152. The search of the cache and the search of the decision tree are then commenced in parallel, via steps 154 and 156, respectively. Thus, the search of the cache and the search of the decision tree start at approximately the same time. As discussed above, the cache will store keys that are frequent fliers and associated information, such as the hashed key and the action(s) to be taken. Thus, the key and corresponding action may generally be obtained using the cache. The method 150 will therefore be fast, requiring essentially the time to commence the searches, look up the key, the hashed key and the action(s) in the cache and return the action(s). At the same time, for a packet having a key that is not a frequent flier, obtaining the action using the decision tree is not unduly delayed. Such a delay could be incurred by commencing the search of the decision tree until some time well after the cache search has been commenced. For example a large delay would result if the search of the decision tree were started after it were determined that the key cannot be found in the cache. Thus, the method 150 relatively rapidly finds the actions associated with the frequent fliers in the cache, while reducing the penalty incurred for non-frequent fliers and the first time a frequent flier is encountered. The method 150 might include terminating an uncompleted search of the decision tree if the search of the cache results in the key, or vice versa.

FIG. 9 depicts a second embodiment of a method 160 for commencing the search of the cache and the decision tree. The key is obtained from the packet, via step 162. The search of the decision tree is then commenced, via step 164. The search of the cache is then started in step 166. Thus, the search of the cache starts after the search of the decision tree. The method 160 may be used if it is desired that all packets experience a more similar delay. Because the search of the cache is frequently significantly faster than that of the decision tree, the search of the cache is delayed. Thus, a packet having an action found in the cache will be delayed slightly because the search of the cache was not immediately commenced. Although the search of the decision tree generally takes much longer than a search of the cache, the time taken to search the decision tree will be closer to that of the time, as measured from the time the key is obtained, taken to search the cache. Furthermore, because frequent fliers tend to be accessed from the cache, the time to test filter rules is still reduced. Thus, the method 160 allows the time taken for packets having keys that are frequent fliers and packets having keys which are not frequent fliers to be equalized while maintaining the benefits of caching using the methods 100 and 120. In addition, the method 160 might include terminating an uncompleted search of the decision tree if the search of the cache results in the key, or vice versa.

FIG. 10 depicts a third embodiment of a method 170 for commencing the search of the cache and the decision tree. The key is obtained from the packet, via step 172. The search of the cache is then started in step 174. The search of the decision tree is then commenced, via step 176. Thus, the search of the cache starts before the search of the decision tree. The method 170 may be used if it is desired that the minimum time be taken for most packets. Because the search of the cache is frequently significantly faster than that of the decision tree and results in the actions for the frequent fliers, the search of the cache is commenced first. Thus, the actions for most packets (those having keys that are frequent fliers) will be obtained in the minimum time possible because no delay will be introduced by starting the search of the decision tree before or at the same time as the search of the cache. Although the search of the decision tree generally takes much longer than a search of the cache and will be penalized by the delay of the start of the search of the decision tree, the search of the decision tree is generally only completed for the first time a frequent flier is encountered and for non-frequent fliers. Thus, the search of the decision tree will seldom be completed to obtain the action. The method 160, therefore, allows the time taken for packets having keys that are frequent fliers to be minimized at the cost of packets having keys which are not frequent fliers being slightly delayed. In addition, the method 170 might include terminating an uncompleted search of the decision tree if the search of the cache results in the key, or vice versa.

Thus, using the methods 100 and 120, filter rules can be more rapidly tested because the action(s) for certain keys will be obtained from a cache instead of a decision tree, particularly a software managed tree. In addition, through the use of a cache that stores information for only one item in each bin and assuming application of the 80–20 rule, the caching can be very efficient, requiring significantly less computational expense. The efficiency can be further enhanced by selecting items to be written to the cache based on the priority of the matching filter rule(s). For example, writing to the cache only when the matching filter rule(s) have a priority of one ensures that only actions for rules which will be enforced are written to the cache. Furthermore, by commencing a search of the cache and a search of the decision tree at different times, as in the methods 150, 160 and 170, different performance goals may be met.

A method and system has been disclosed for testing filter rules rapidly and efficiently using a cache and a decision tree, preferably a software managed tree. Software written according to the present invention is to be stored in some form of computer-readable medium, such as memory, CD-ROM or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for testing a plurality of filter rules in a computer system, the plurality of filter rules being used with a key, the key capable of matching at least one filter rules of the plurality of filter rules, the at least one filter rule corresponding to at least one action, the computer system including a cache and a decision tree, the cache including a plurality of bins, the method comprising the steps of:
    (a) searching a plurality of stored keys in the cache for the key, a plurality of stored filter rules corresponding to the plurality of stored keys, a plurality of stored actions corresponding to the plurality of stored filter rules, the cache storing each of the plurality of stored keys and at least one stored action of the plurality of stored actions in each bin of a portion of the plurality of bins;
    (b) obtaining the at least one action from the plurality of stored actions in the cache if the key is found in the plurality of stored keys of the cache;
    (c) obtaining the at least one action using the decision tree if the key is not found in the plurality of stored keys in the cache.

2. The method of claim 1 further comprising the step of:
    (d) storing the key and the at least one action in a bin of the plurality of bins corresponding to the key in the cache if the at least one action is obtained using the decision tree.

3. The method of claim 1 wherein the key includes a first plurality of bits, wherein the cache stores a plurality of stored hashed keys in the plurality of bins, the plurality of stored hashed keys corresponding to the plurality of stored keys, and wherein the cache searching step (a) further includes the step of:
    (a1) hashing the key to provide a hashed key, the hashed key including a second plurality of bits that is fewer than the first plurality of bits;
    (a2) searching the plurality of stored hashed keys in the cache for the hashed key;
    (a3) determining whether a stored key of the plurality of stored keys corresponding to the hashed key is the same as the key if the hashed key is found in the plurality of stored hashed keys.

4. The method of claim 3 wherein the obtaining the at least one action from the cache step (b) further includes the step of:
    (b1) obtaining the at least one action from a bin of the portion of the plurality of bins if the stored key is the same as the key, the bin storing the hashed key, the key and the at least one action.

5. The method of claim 4 therein each of the plurality of filter rules further has a priority and wherein the method further comprising the step of:
    (d) storing the key and the at least one action in a bin of the plurality of bins corresponding to the key if the at least one action is obtained using the decision tree and if the at least one filter rule has a priority greater than a stored priority of a stored filter rule of the plurality of stored filter rules corresponding to a stored action currently stored in the bin.

6. The method of claim 1 wherein the decision tree is a software managed tree.

7. A method for testing a plurality of filter rules in a computer system, the plurality of filter rules being used with a key, the key capable of matching at least one filter rules of the plurality of filter rules, the at least one filter rule corresponding to at least one action, the computer system including a cache and a decision tree, the cache including a plurality of bins, the method comprising the comprising the steps of:
    (a) searching a plurality of stored keys in the cache for the key, a plurality of stored filter rules corresponding to the plurality of stored keys, a plurality of stored actions corresponding to the plurality of stored filter rules, the cache storing each of the plurality of stored keys and at least one stored action of the plurality of stored actions in each bin of a portion of the plurality of bins;
    (b) obtaining the at least one action from the plurality of stored actions in the cache if the key is found in the plurality of stored keys of the cache;
    (c) obtaining the at least one action using the decision tree if the key is not found in the plurality of stored keys in the cache;
wherein each of the plurality of filter rules further has a priority, the method further comprising the step of:
    (d) storing the key and the at least one action in a bin of the plurality of bins corresponding to the key if the at least one action is obtained from the decision tree and if the at least one filter rule has a priority of one.

8. A method for testing a plurality of filter rules in a computer system, the plurality of filter rules being used with a key, the key capable of matching at least one filter rules of the plurality of filter rules, the at least one filter rule corresponding to at least one action, the computer system including a cache and a decision tree, the cache including a plurality of bins, the method comprising the steps of:
    (a) searching a plurality of stored keys in the cache for the key, a plurality of stored filter rules corresponding to the plurality of stored keys, a plurality of stored actions corresponding to the plurality of stored filter rules, the cache storing each of the plurality of stored keys and at least one stored action of the plurality of stored actions in each bin of a portion of the plurality of bins;
    (b) obtaining the at least one action from the plurality of stored actions in the cache if the key is found in the plurality of stored keys of the cache;
    (c) obtaining the at least one action using the decision tree if the key is not found in the plurality of stored keys in the cache;
wherein the obtaining the at least one action from the decision tree step (c) further includes the step of:
    (c1) commencing a search of the decision tree for the at least one filter rule using the key;

(c2) terminating the search of the decision tree if the key is found in the plurality of stored keys in the cache in searching step (a);

(c3) completing the search of the decision tree for the at least one filter rule using the key if the search is not terminated in step (c2); and (c4) determining the at least on action corresponding to the at least one filter rule.

9. The method of claim 8 wherein search commencing step (c1) further includes the step of:

(c1i) commencing the search of the decision tree after the cache searching step (a) has commenced.

10. The method of claim 8 wherein search commencing step (c1) further includes the step of:

(c1i) commencing the search of the decision tree before the cache searching step (a) has commenced.

11. The method of claim 8 wherein search commencing step (c1) further includes the step of:

(c1i) commencing the search of the decision tree at the same time as the cache searching step (a) has commenced.

12. A computer-readable medium including a program for testing a plurality of filter rules in a computer system, the plurality of filter rules being used with a key, the key capable of matching at least one filter rules of the plurality of filter rules, the at least one filter rule corresponding to at least one action, the computer system including a cache and a decision tree, the cache including a plurality of bins, the method comprising the steps of:

(a) searching a plurality of stored keys in the cache for the key, a plurality of stored filter rules corresponding to the plurality of stored keys, a plurality of stored actions corresponding to the plurality of stored filter rules, the cache storing each of the plurality of stored keys and at least one stored action of the plurality of stored actions in each bin of a portion of the plurality of bins;

(b) obtaining the at least one action from the plurality of stored actions in the cache if the key is found in the plurality of stored keys of the cache;

(c) obtaining the at least one action using the decision tree if the key is not found in the plurality of stored keys in the cache.

13. The computer-readable medium of claim 12 further including instructions for:

(d) storing the key and the at least action in a bin of the plurality of bins corresponding to the key in the cache if the at least one action is obtained using the decision tree.

14. The computer-readable medium of claim 12 wherein the key includes a first plurality of bits, wherein the cache stores a plurality of stored hashed keys in the plurality of bins, a plurality of stored keys corresponding to the hashed keys, and wherein the cache searching instruction (a) further includes instructions for:

(a1) hashing the key to provide a hashed key, the hashed key including a second plurality of bits that is fewer than the first plurality of bits;

(a2) searching the plurality of stored hashed keys in the cache for the hashed key;

(a3) determining whether a stored key of the plurality of stored keys corresponding to the hashed key is the same as the key if the hashed key is found in the plurality of stored hashed keys.

15. The computer-readable medium of claim 14 wherein the obtaining the at least one action from the cache instructions (b) further includes instructions for:

(b1) obtaining the at least one action from a bin of the portion of the plurality of bins if the stored key is the same as the key, the bin storing the hashed key, the key and the at least one action.

16. The computer-readable medium of claim 15 wherein each of the plurality of filter rules further has a priority and wherein the program further includes instructions for:

(d) storing the key and the at least one action in a bin of the plurality of bins corresponding to the key if the at least one action is obtained using the decision tree and if the at least one filter rule has a priority greater than a stored priority of a stored filter rule of the plurality of stored filter rules having an action currently stored in the bin.

17. The computer-readable medium of claim 12 wherein the decision tree is a software managed tree.

18. A computer-readable medium including a program for testing a plurality of filter rules in a computer system, the plurality of filter rules being used with a key, the key capable of matching at leas t one filter rules of the plurality of filter rules, the at least one filter rule corresponding to at least one action, the computer system including a cache and a decision tree, the cache including a plurality of bins, the method comprising the steps of:

(a) searching a plurality of stored keys in the cache for the key, a plurality of stored filter rules corresponding to the plurality of stored keys, a plurality of stored actions corresponding to the plurality of stored filter rules, the cache storing each of the plurality of stored keys and at least one stored action of the plurality of stored actions in each bin of a portion of the plurality of bins;

(b) obtaining the at least one action from the plurality of stored actions in the cache if the key is found in the plurality of stored keys of the cache;

(c) obtaining the at least one action using the decision tree if the key is not found in the plurality of stored keys in the cache;

wherein each of the plurality of filter rules further has a priority, the program further including instructions for:

(d) storing the key and the at least one action in a bin of the plurality of bins corresponding to the key if the at least one action is obtained from the decision tree and if the at least one filter rule has a priority of one.

19. A computer-readable medium including a program for testing a plurality of filter rules in a computer system, the plurality of filter rules being used with a key, the key capable of matching at least one filter rules of the plurality of filter rules, the at least one filter rule corresponding to at least one action, the computer system including a cache and a decision tree, the cache including a plurality of bins, the method comprising the steps of:

(a) searching a plurality of stored keys in the cache for the key, a plurality of stored filter rules corresponding to the plurality of stored keys, a plurality of stored actions corresponding to the plurality of stored filter rules, the cache storing each of the plurality of stored keys and at least one stored action of the plurality of stored actions in each bin of a portion of the plurality of bins;

(b) obtaining the at least one action from the plurality of stored actions in the cache if the key is found in the plurality of stored keys of the cache;

(c) obtaining the at least one action using the decision tree if the key is not found in the plurality of stored keys in the cache;

wherein the obtaining the at least one action from the decision tree instructions (c) further includes the step of:

(c1) commencing a search of the decision tree for the at least one filter rule using the key;

(c2) terminating the search of the decision tree if the key is found in the plurality of stored keys in the cache in searching step (a);

(c3) completing the search of the decision tree for the at least one filter rule using the key if the search is not terminated in step (c2); and (c4) determining the at least on action corresponding to the at least one filter rule.

20. The computer-readable medium of claim 19 wherein search commencing instructions (c1) further includes instructions for:

(c1i) commencing the search of the decision tree after the cache searching step (a) has commenced.

21. The computer-readable medium of claim 19 wherein search commencing instructions (c1) further includes instructions for:

(c1i) commencing the search of the decision tree before the cache searching step (a) has commenced.

22. The computer-readable medium of claim 19 wherein search commencing instructions (c1) further includes instructions for:

(c1i) commencing the search of the decision tree at the same time as the cache searching step (a) has commenced.

23. A system for testing a plurality of filter rules in a computer system, the plurality of filter rules being used with a key, the key capable of matching at least one filter rule of the plurality of filter rules, the at least one filter rule of the plurality of filter rules, the at least one filter rule corresponding to at least one action, the system comprising:

a plurality of hosts for transmitting and receiving data; and a switch for determining the at least one action for the at least one filter rule that the key can match, the switch including a cache and a decision tree, the cache including a plurality of bins, the cache capable of storing a plurality of stored keys, a plurality of stored action corresponding to the stored filter rules matching the plurality of stored keys, the ache storing each of the plurality of stored keys and at least one stored action of the plurality of stored actions in each bin of a portion of the plurality of bins, the switch for searching the plurality of stored keys in the cache for the key, obtaining the at least one action from the plurality of stored actions in the cache if the key is found in the plurality of stored keys of the cache, and for obtaining the at least one action using the decision tree if the key is not found in the plurality of stored keys in the cache.

24. The system of claim 23 wherein the key includes a first plurality of bits, wherein the cache stores a plurality of stored hashed keys in the plurality of bins, the plurality of stored keys corresponding to the plurality of stored hashed keys, and wherein the switch searches the cache by hashing the key to provide a hashed key, the hashed key including a second plurality of bits that is fewer than the first plurality of bits, searching the plurality of stored hashed keys in the cache for the hashed key, and determining whether a stored key of the plurality of stored keys corresponding to the hashed key is the same as the key if the hashed key is found in the plurality of stored hashed keys.

25. The system of claim 24 wherein the obtaining the switch obtains the at least one action from the cache by obtaining the at least one action from a particular bin of the portion of the plurality of bins if the stored key is the same as the key, the particular bin storing the hashed key, the key and the at least one action.

26. The system of claim 24 wherein each of the plurality of filter rules further has a priority and wherein the switch further stores the key and the at least one action in a particular bin of the plurality of bins corresponding to the key if the at least one action is obtained using the decision tree and if the at least one filter rule has a priority greater than a stored priority of a filter rule of the plurality of filter rules having at least one stored action currently stored in the bin.

27. The system of claim 24 wherein the switch further stores the key and the at least one action in a particular bin of the plurality of bins corresponding to the key in the cache if the at least one action is obtained from the decision tree.

28. The system of claim 23 wherein the decision tree is a software managed tree.

29. A system for testing a plurality of filter rules in a computer system, the plurality of filter rules being used with a key, the key capable of matching at least one filter rule of the plurality of filter rules, the at least one filter rule of the plurality of filter rules, the at least one filter rule corresponding to at least one action, the system comprising:

a plurality of hosts for transmitting and receiving data; and a switch for determining the at least one action for the at least one filter rule that the key can match, the switch including a cache and a decision tree, the cache including a plurality of bins, the cache capable of storing a plurality of stored keys, a plurality of stored action corresponding to the stored filter rules matching the plurality of stored keys, the ache storing each of the plurality of stored keys and at least one stored action of the plurality of stored actions in each bin of a portion of the plurality of bins, the switch for searching the plurality of stored keys in the cache for the key, obtaining the at least one action from the plurality of stored actions in the cache if the key is found in the plurality of stored keys of the cache, and for obtaining the at least one action using the decision tree if the key is not found in the plurality of stored keys in the cache;

wherein the switch obtains the at least one action using the decision tree by commencing a search of the decision tree for the at least one filter rule using the key, terminating the search of the decision tree if the key is found in the plurality of stored keys in the cache, completing the search of the decision tree for the at least one filter rule using the key if the search is not terminated and determining the at least one action corresponding to the at last on filter rule.

30. The system of claim 29 wherein the switch further commences searching of the decision tree after the switch has commenced searching the cache.

31. The system of claim 29 wherein the switch further commences searching of the decision tree before the commencing searching of the cache.

32. The system of claim 29 wherein the switch further commences searching of the decision tree at the same time as commencing searching of the cache.

33. A switch for testing a plurality of filter rules in a computer system, the plurality of filter rules being used with a key, the key capable of matching at least one filter rules of the plurality of filter rules, at least one action corresponding to the at least one filter rule, the system comprising:

a plurality of hosts for transmitting and receiving data;

a processor for providing a decision tree and a cache, the cache including a plurality of bins, the cache capable of storing a plurality of stored actions and a plurality of stored keys, the plurality of stored actions corresponding to a plurality of stored filter rules matching the plurality of stored keys, the cache storing each of the plurality of stored keys and at least one corresponding stored action of the plurality of stored actions in each bin of a portion of the plurality of bins, the processor further including logic for determining the at least one action, the logic for searching the plurality of stored keys in the cache for the key, obtaining the at least one action if the key is found in the plurality of stored keys of the cache, and for obtaining the at least one action using the decision tree if the key is not found in the plurality of stored keys in the cache.

* * * * *